United States Patent [19]

Cseh et al.

[11] Patent Number: 5,066,695
[45] Date of Patent: Nov. 19, 1991

[54] HIGH-MOLECULAR WEIGHT ORGANIC MATERIAL CONTAINING A METAL COMPLEX PIGMENT BASAED ON HYDRAZONE

[75] Inventors: Georg Cseh, Posat; Paul Lienhard, Frenkendorf; Walter Wiedemann, Riehen, all of Switzerland

[73] Assignee: Ciba-Geigy Corporation, Ardsley, N.Y.

[21] Appl. No.: 374,321

[22] Filed: Jun. 29, 1989

[30] Foreign Application Priority Data

Jul. 1, 1988 [CH] Switzerland ................ 2514/88

[51] Int. Cl.$^5$ .............................................. C08K 5/34
[52] U.S. Cl. ................................ 524/87; 524/94; 524/102; 524/103; 525/175; 534/692
[58] Field of Search ............ 524/103, 87, 102, 94; 525/175; 534/692

[56] References Cited

U.S. PATENT DOCUMENTS

| | | | |
|---|---|---|---|
| 4,612,014 | 9/1986 | Felix | 8/452 |
| 4,670,486 | 6/1987 | Cseh et al. | 524/93 |
| 4,775,747 | 10/1988 | Cseh et al. | 534/692 |

OTHER PUBLICATIONS

Birader et al., Curr. Sci., 45(11), pp. 398-400 (1976)=C. A. 85: 86489f.
J. Inorg. Nucl. Chem., 42 (3) pp. 331-341 (1980)=C. A. 93(12:124906q.
J. Inorg. Nucl. Chem., 42(6), pp. 821-831 (1980)=C. A. 94(2):105062.
J. Inorg. Nucl. Chem., (43)(1), pp. 57-67 (1981)=C. A. 94(22): 184712d.
Indian J. Chem. Sect. A, 20A(5), pp. 520-523 (1981)=C. A. 95(8): 72347c.

Primary Examiner—Paul R. Michl
Assistant Examiner—Yong S. Lee
Attorney, Agent, or Firm—JoAnn Villamizar

[57] ABSTRACT

High-molecular weight organic material containing at least one metal complex of a ligand of formula I:

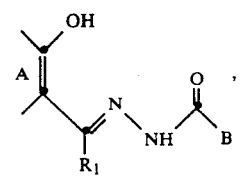

wherein A is a carbocyclic aromatic or heterocyclic aromatic radical, B is a carbocyclic aromatic radical or a heterocyclic aromatic radical containing at least one N atom, it being necessary for at least one of the radicals A and B to be heterocyclic, and $R_1$ is —$C_1$-$C_{18}$-alkyl, a carbocyclic aromatic radical or a heterocyclic aromatic radical containing at least one N atom, and the metal is a transition metal cation carrying a double positive charge selected from $Ni^{2+}$, $Cu^{2+}$, $Co^{2+}$, $Zn^{2+}$, $Mn^{2+}$, $Fe^{2+}$, $Cd^{2+}$ or $Pt^{2+}$ or the radical $VO^{2+}$.

9 Claims, No Drawings

HIGH-MOLECULAR WEIGHT ORGANIC MATERIAL CONTAINING A METAL COMPLEX PIGMENT BASAED ON HYDRAZONE

The invention relates to high-molecular weight organic material containing at least one metal complex pigment based on hydrazone, and to novel metal complexes.

Metal complexes and their use as colourants for colouring high-molecular weight organic materials have been known for a long time. Thus metal complexes of hydrazones are described as pigments e.g. in U.S. Pat. No. 4,612,014, the ligand of the metal complexes listed in the said document having an aldehyde-hydrazone radical. U.S. Pat. No. 4,670,486 also discloses similar metal complexes which have an azo group in addition to the hydrazone radical in the ligand. Although such metal complexes generally possess good pigment properties, they do not always satisfy modern technological demands, e.g. because of low heat stability and/or inadequate dispersibility.

It has now been found, surprisingly, that specific metal complexes with structurally similar ligands, which carry particular substituents in the hydrazone radical, are very suitable for colouring high-molecular weight organic materials and have excellent pigment properties, especially dispersibility and heat stability.

The invention accordingly relates to high-molecular weight organic material containing at least one metal complex of a ligand of formula I:

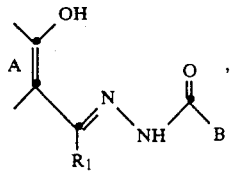
(I)

wherein A is a carbocyclic aromatic or heterocyclic aromatic radical, B is a carbocyclic aromatic radical or a heterocyclic aromatic radical containing at least one N atom, it being necessary for at least one of the radicals A and B to be heterocyclic, and $R_1$ is $-C_1-C_{18}$-alkyl, a carbocyclic aromatic radical or a heterocyclic aromatic radical containing at least one N atom, and the metal is a transition metal cation carrying a double positive charge selected from $Ni^{2+}$, $Cu^{2+}$, $Co^{2+}$, $Zn^{2+}$, $Mn^{2+}$, $Fe^{2+}$, $Cd^{2+}$ or $Pt^{2+}$ or the radical $VO^{2+}$.

Preferred metal cations are $Ni^{2+}$, $Cu^{2+}$, $Co^{2+}$ and $Zn^{2+}$, in particular $Ni^{2+}$ and $Cu^{2+}$. It is also possible to use mixtures of such metal cations, for example mixtures of $Ni^{2+}$ and $Zn^{2+}$, or of $Co^{2+}$ and $Zn^{2+}$.

One or two rests of a ligand of formula I can be combined with one metal cation, so that 1:1- or 1:2-metal complexes of neutral character can be obtained.

The 1:1-metal complexes according to the present invention can be monomer or, in particular the complexes with $Cu^{2+}$, dimer. With the monomer 1:1-metal complexes, the fourth co-ordination position of the metal ion can be neutralized by an additional ligand such as $H_2O$, $NH_3$ or $CH_3COO-$. This depends to a large degree on the conditions of preparation of the metal complexes and the nature of the metal cation-releasing agent used. Monomeric 1:1 metal complexes with acetate radicals can be represented e.g. by the following formula:

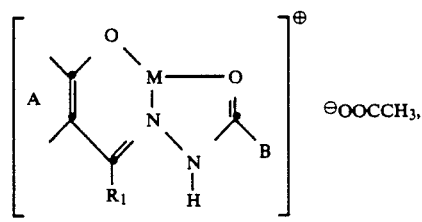

wherein M is the metal cation and the symbols A, B and $R_1$ are as defined above.

However, 1:1 complexes of neutral character are preferred.

A as a carbocyclic aromatic radical is e.g. a monocyclic or bicyclic radical such as a phenylene, phenylphenylene or naphthylene radical, or, in particular, together with the hydroxyl group already shown in formula I, it is a hydroxybenzene or hydroxynaphthalene derivative of the formula

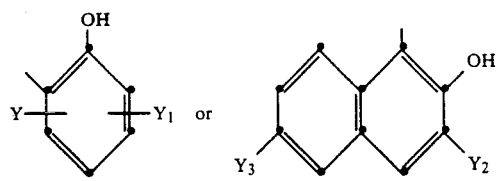

wherein Y is $-H$, $-Cl$, $-Br$, $-C_1-C_{18}$-alkyl, $-C_1-C_{18}$-alkoxy or $-CN$, $Y_1$ is $-H$, $-Cl$, $-Br$, $-C_1-C_{18}$-alkyl, $-C_1-C_{18}$-alkoxy, $-OCO-C_1-C_{18}$-alkyl or $-CN$, $Y_2$ is $-H$, $-COOH$, $-CONH_2$, $-COO-C_1-C_4$-alkyl, $-CONH-C_1-C_4$-alkyl or a phenylcarbamoyl group which is unsubstituted or substituted by halogen atoms and/or $-C_1-C_4$-alkyl groups and/or $-C_1-C_4$-alkoxy groups, and $Y_3$ is an H or halogen atom or a methoxy, nitro or cyano group.

Halogen is e.g. bromine, iodine or chlorine, Y and $Y_1$ are in particular chlorine and $Y_3$ is in particular bromine. As regards Y, $Y_1$ and $Y_2$, $C_1-C_{18}$-alkyl in the various groups is e.g. methyl, ethyl, n-propyl, iso-propyl, n-butyl, tert-butyl, n-pentyl, n-hexyl, isohexyl, n-decyl, n-dodecyl or n-octadecyl. As regards Y and $Y_1$, $C_1-C_{18}$-alkoxy is e.g. methoxy, ethoxy, n-propoxy, iso-propoxy, n-butoxy, n-hexyloxy, n-octyloxy, n-dodecyloxy or n-octadecyloxy.

Examples of o-hydroxybenzene derivatives according to the above formula are derived e.g. from: hydroxybenzene, 4- or 3-chlorohydroxybenzene, 4-methylhydroxybenzene, 4-methoxyhydroxybenzene, 3-octyloxyhydroxybenzene, 2,4-dichlorohydroxybenzene and 4-bromohydroxybenzene.

Examples of o-hydroxynaphthalene derivatives according to the above formula are derived e.g. from: 2-naphthol, 6-bromo-2-naphthol, 6-nitro-2-naphthol, 2-hydroxy-3-naphthoic acid, 2-hydroxy-3-naphthoic acid anilide, 2-hydroxy-6-bromo-3-naphthoic acid anilide, 2-hydroxy-3-naphthoic acid o-toluidide or p-toluidide, 2-hydroxy-3-naphthoic acid 2'-methoxyanilide or 2'-ethoxyanilide, 2-hydroxy-3-naphthoic acid 2',4'-dimethoxy-5'-chloroanilide, 2-hydroxy-3-naphthoic acid 2',5'-di-methoxyanilide, 2-hydroxy-3-naphthoic acid 2'-methyl-4'-chloroanilide, 2-hydroxy-3-naphthoic acid 2'-methyl-5'-chloroanilide, 25'-chloroanilide, 2-hydroxy-3-naphthoic acid 4'-chloroanilide, 2-hydroxy- 3-naphthoic acid 3'-nitroanilide and 2-hydroxy-3-naphthoic acid amide.

A as a heterocyclic aromatic radical is e.g. a 5- or 6-membered aromatic N-heterocyclic compound which can additionally have an O or S atom and may contain another N atom in the ring or may contain a fused benzene ring or another nitrogen-containing 5- or 6-membered aromatic heterocyclic ring. Examples of radicals A, together with the hydroxyl group already shown in formula I, are those of the formula

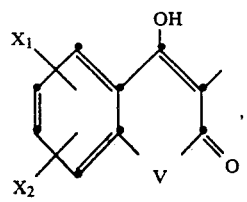

wherein $X_1$ and $X_2$ independently of one another are —H, —Cl or —Br, —CH$_3$, —OCH$_3$ or —COOCH$_3$ and V is O, NH or N(C$_1$-C$_5$-alkyl), or those of the formula

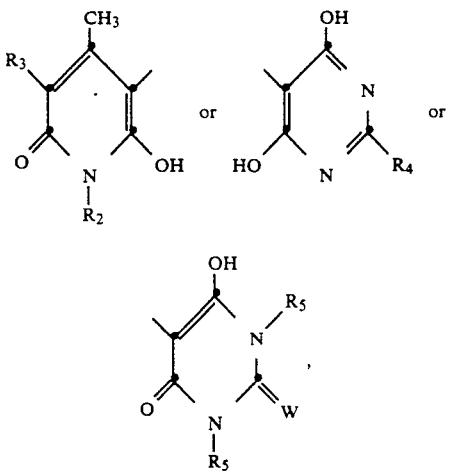

wherein $R_2$ is —H or —C$_1$-C$_5$-alkyl, $R_3$ is —CN, —CONH-C$_1$-C$_5$-alkyl or —CONH$_2$, $R_4$ is —H, —C$_1$-C$_5$-alkyl or a phenyl group, W is O or S and both radicals $R_5$ independently of one another are —H, —C$_1$-C$_5$-alkyl or phenyl which is unsubstituted or substituted by —Cl or —CH$_3$, or those of the formula

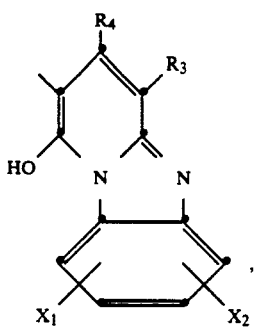

wherein $X_1$, $X_2$, $R_3$ and $R_4$ are as defined above, or those of the formula

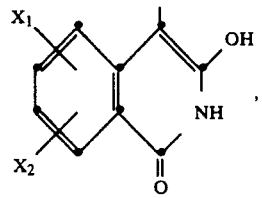

wherein $X_1$ and $X_2$ are as defined above, or pyrazolones of the formula

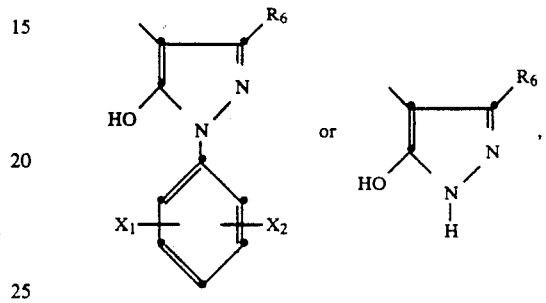

wherein $R_6$ is —C$_1$-C$_5$-alkyl, —COOH, alkoxycarbonyl having 2-6 C atoms or carbamoyl and $X_1$ and $X_2$ are as defined above.

C$_1$-C$_5$-alkyl in the above definitions is e.g. methyl, ethyl, n-propyl, isopropyl, n-butyl, tert-butyl or n-pentyl.

Examples of aromatic heterocyclic compounds from which radicals of the above formulae are derived are: 2,4-dihydroxy-6-methylpyridine, 2,6-dihydroxy-4-methyl-5-cyanopyridine, 2,6-dihydroxy-4-methyl-5-carbamoylpyridine, 2,4-dihydroxyquinoline, 2,4-dihydroxy-5-, -6-, -7- or -8-chloroquinoline, 2,4-dihydroxy-6,8- or -7,8-dichloroquinoline, 2,4-dihydroxy-6-, -7- or -8-methylquinoline, 2,4-dihydroxy-6-chloro-8-methylquinoline, barbituric acid, thiobarbituric acid, 2-methyl-4,6-dihydroxypyrimidine, 2-phenyl-4,6-dihydroxypyrimidine, 4-hydroxycoumarin, 4-hydroxy-6-methylcoumarin, 4-hydroxy-6-methoxycoumarin 1-phenyl-3-methylpyrazol-5-one, 1-phenyl-3-carboxypyrazol-5-one, 1-phenyl-3-methoxycarbonylpyrazol-5-one, 1-phenyl-3-ethoxycarbonylpyrazol-5-one, 1-o-chlorophenyl-3-methylpyrazol-5-one, 1-p-chlorophenyl-3-methyl-pyrazol-5-one, 1-o-methylphenyl-3-methylpyrazol-5-one, 1-p-methyl-phenyl-3-methylpyrazol-5-one and 3-methylpyrazol-5-one.

B or $R_1$ as a carbocylic aromatic radical is e.g. unsubstituted phenyl or naphthyl, phenyl substituted by one to three identical or different substituents from the group comprising —C$_1$-C$_5$-alkyl, —C$_1$-C$_5$-alkoxy, —Cl and —Br, or by one or two identical or different substituents from the group comprising —NO$_2$, —CF$_3$ and phenyl-COOC$_1$-C$_5$-alkyl, or by phenoxy or benzoylamino which is unsubstituted or substituted by chlorine, bromine, methyl or methoxy, or naphthyl substituted by —Cl, —CH$_3$ or —OCH$_3$.

C$_1$-C$_5$-alkyl in the above definitions can have the same meanings as those already indicated above.

If B and $R_1$ are heterocyclic aromatic radicals containing at least one N atom, the said radicals are derived e.g. from the following heterocyclic carboxylic acids: pyrrole-2-carboxylic acid, pyridine-2-, -3- and -4-carboxylic acids, pyrazinecarboxylic acid, indole-2-carboxylic acid and quinoline-4-carboxylic acid, in particular pyridine-2-, -3- and -4-carboxylic acids.

$R_1$ as $C_1$-$C_{18}$-alkyl is e.g. methyl, ethyl n-propyl, isopropyl, n-butyl, tert-butyl, n-hexyl, isohexyl, n-octyl, n-decyl, n-dodecyl or n-hexadecyl.

Preferred high-molecular weight organic material contains at least one metal complex of a ligand of formula I in which A is a phenylene, phenylphenylene or naphthylene radical and B is a heterocyclic aromatic radical containing an N atom, and the metal cation is $Ni^{2+}$, $Cu^{2+}$, $Co^{2+}$ or $Zn^{2+}$.

Especially preferred high-molecular weight organic material contains at least one metal complex of a ligand of formula II or III:

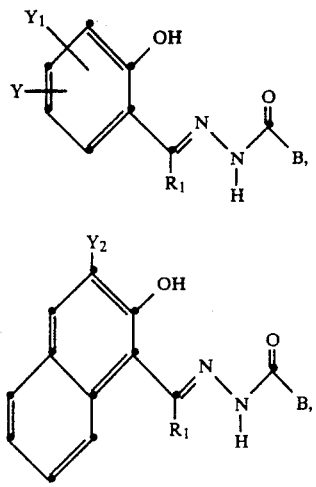

wherein Y is —H or —Cl, $Y_1$ is —H, —Cl, —Br, —$CH_3$ or —$OC_1$-$C_{18}$-alkyl, $Y_2$ is —H, —COOH, —$CONH_2$ or a phenylcarbamoyl group which is unsubstituted or substituted by —Cl and/or —$CH_3$ and/or —$OCH_3$, $R_1$ is —$C_1$-$C_5$-alkyl or a phenyl radical which is unsubstituted or substituted by —Cl, —$CH_3$ or —$OCH_3$, and B is a pyrid-2-, -3- or -4-yl radical, and the metal cation is $Ni^{2+}$, $Cu^{2+}$, $Co^{2+}$ or $Zn^{2+}$.

Most preferred high-molecular weight organic material contains a metal complex of a ligand of formula II or III in which Y is —H, $Y_1$ is —H, —Cl or —$CH_3$, $Y_2$ is —H, $R_1$ is —$CH_3$, —$C_2H_5$ or —$C_6H_5$ and B is pyrid-2-, -3- or -4-yl, and the metal cation is $Ni^{2+}$, $Cu^{2+}$ or $Co^{2+}$.

Of very particular interest is high-molecular weight organic material containing a metal complex of a ligand of formula II in which Y and $Y_1$ are —H, $R_1$ is —$CH_3$, —$C_2H_5$ or —$C_6H_5$ and B is pyrid-2-, -3- or -4-yl, and the metal cation is $Ni^{2+}$ or $Cu^{2+}$.

Also of interest is high-molecular weight organic material containing at least one metal complex of a ligand of formula I in which A is a quinoline, isoquinoline, coumarin, pyridine, pyrimidine or pyrazolone radical and B is a heterocyclic aromatic radical containing an N atom, and the metal cation is $Ni^{2+}$, $Cu^{2+}$, $Co^{2+}$ or $Zn^{2+}$. Among these preferred meanings, A is in particular a pyrazolone, pyrimidine or quinoline radical.

Most preferred high-molecular weight organic material contains at least one metal complex of a ligand of formula IV:

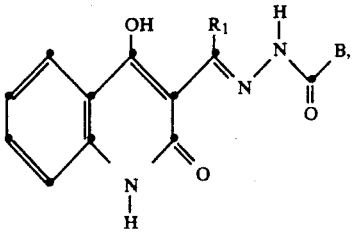

wherein $R_1$ is —$C_1$-$C_5$-alkyl or -$C_6H_5$ and B is pyrid-2-, -3- or -4-yl, and the metal cation is $Ni^{2+}$, $Cu^{2+}$ or $Co^{2+}$.

Of very particular interest is high-molecular weight organic material containing at least one metal complex of formula IV in which $R_1$ is —$CH_3$, —$C_2H_5$ or —$C_6H_5$ and B is pyrid-2-, -3- or -4-yl, and the metal cation is $Ni^{2+}$ or $Cu^{2+}$.

The metal complexes, possible according to the invention, of a ligand of formula I in which A is a phenylene, chlorophenylene or methylphenylene radical, $R_1$ is —$CH_3$ and B is a pyridyl or quinoline radical are known and are described e.g. in Curr. Sci. 45(4), 124–5 [=C.A. 84(24), 173120b], in J. Inorg. Nucl. Chem. 42(3), 331–41 [=C.A. 93(12), 124906q], 42(b), 821–31 [=C.A. 94(2), 10506z] or 43(1), 57–67 [=C.A. 94(22), 184712d], or in Indian J. Chem., Sect. A, 20A(5), 520–523.

The other metal complexes of the present patent application, on the other hand, are novel and therefore also represent a subject of the invention.

A further subject of the invention is therefore represented by metal complexes of a ligand of formula I:

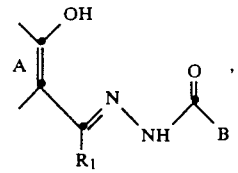

wherein A is a carbocyclic aromatic or heterocyclic aromatic radical, B is a carbocyclic aromatic radical or a heterocyclic aromatic radical containing at least one N atom, it being necessary for at least one of the radicals A and B to be heterocyclic, and $R_1$ is —$C_1$-$C_{18}$-alkyl, a carbocyclic aromatic radical or a heterocyclic aromatic radical containing at least one N atom, and the metal is a transition metal cation carrying a double positive charge selected from $Ni^{2+}$, $Cu^{2+}$, $Co^{2+}$, $Zn^{2+}$, $Mn^{2+}$, $Fe^{2+}$, $Cd^{2+}$ or $Pt^{2+}$ or the radical $VO^{2+}$, with the proviso that B may not be a pyridyl or quinoline radical if A is phenylene, chlorophenylene or methylphenylene and $R_1$ is methyl.

Ni, Cu, Co or Zn complexes are preferred, but Ni and Cu complexes are most preferred according to the above definition.

Preferred metal complexes have a ligand of formula II or III above in which Y is —H or —Cl, $Y_1$ is —H, —Cl, —Br, —$CH_3$ or —$OC_1$-$C_{18}$-alkyl, $Y_2$ is —H, —COOH, —$CONH_2$ or a phenylcarbamoyl group which is unsubstituted or substituted by —Cl and/or —$CH_3$ and/or —$OCH_3$, $R_1$ is —$C_2$-$C_5$-alkyl or a phenyl radical which is unsubstituted or substituted by —Cl, —$CH_3$ or —$OCH_3$, and B is a pyrid-2-, -3- or -4-yl radical, and the metal cation is $Ni^{2+}$, $Cu^{2+}$, $Co^{2+}$ or $Zn^{2+}$.

Most preferred metal complexes have a ligand of formula II or III in which Y is —H, $Y_1$ is —H, —Cl or —$CH_3$, $Y_2$ is —H, $R_1$ is —$C_2H_5$ or —$C_6H_5$ and B is pyrid-2-, -3- or -4-yl, and the metal cation is $Ni^{2+}$, $Cu^{2+}$ or $Co^{2+}$.

Especially preferred metal complexes have a ligand of formula II in which Y and $Y_1$ are —H, $R_1$ is —$C_2H_5$ or —$C_6H_5$ and B is pyrid-2-, -3- or -4-yl, and the metal cation is $Ni^{2+}$ or $Cu^{2+}$.

Other preferred metal complexes are those of a ligand of formula IV:

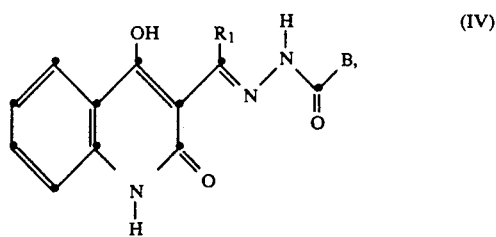

wherein $R_1$ is —$C_1$-$C_5$-alkyl or —$C_6H_5$ and B is pyrid-2-, -3- or -4-yl, and the metal cation is $Ni^{2+}$, $Cu^{2+}$ or $Co^{2+}$.

Most preferred metal complexes are those of formula IV above in which $R_1$ is —$CH_3$, —$C_2H_5$ or —$C_6H_5$ and B is pyrid-2-, -3- or -4yl, and the metal cation is $Ni^{2+}$ or $Cu^{2+}$.

Both the known and the novel metal complexes of the ligands of formula I can be prepared by processes known per se, e.g. by condensing a compound of formula V:

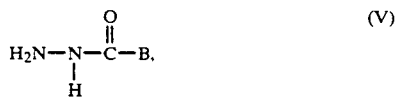

wherein B is as defined above, with a ketone of formula VI:

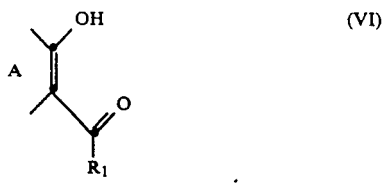

or a ketimine of formula VII:

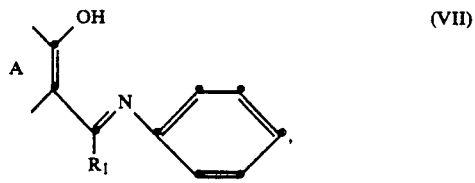

wherein A and $R_1$ are as defined above, in an inert solvent, and, either during or after the condensation reaction, adding a divalent metal cation as defined above.

The starting materials of formulae V, VI and VII can be prepared by known processes, e.g. as described in British patent no. 1467595 (p. 9–10).

Examples of compounds of formula VI are: 2-hydroxyacetophenone, 2-hydroxy-3-, -4- or -5-chloroacetophenone, 2-hydroxy-3-, -4- or -5-methylacetophenone, 2-hydroxy-5-tert.-butylacetophenone, 2-hydroxy-3-, -4- or -5-methoxyacetophenone, 2-hydroxy-5-ethoxyacetophenone, 2-hydroxybenzophenone, 2-hydroxy-5-chlorobenzophenone, 2-hydroxy-4-chlorobenzophenone, 2-hydroxy-5-methylbenzophenone, 2-hydroxy-4-methylbenzophenone, 2-hydroxy-3-methoxybenzophenone, 2-hydroxy-4-methoxybenzophenone, 2-hydroxy-5-methoxybenzophenone, 2-hydroxy-4,4'-dichlorobenzophenone, 2-hydroxy-5,4'-dichlorobenzophenone, 2-hydroxy-4-octyloxybenzophenone, 2-hydroxy-4-dodecyloxybenzophenone, 2'-hydroxydodecanophenone, 2-hydroxypropiophenone, dehydroacetic acid (=3-acetyl-4-hydroxy-6-methyl-2-pyrone), 3-acetyl-2,4-dihydroxy-6-methylpyridine, 3-acetyl-2,4-dihydroxyquinoline and 3-acetyl-2,4-dihydroxycoumarin.

Both the 1:1 and the 1:2 metal complexes can be prepared by this process. As a rule, electron-attracting groups in the radical A or B and an excess of metal cation-releasing agent promote the formation of the 1:1 metal complexes.

Suitable divalent metal cation-releasing agents are salts or complex compounds of the above metals, especially the formates, stearates, chlorides, nitrates, sulfates or acetylacetonates, but in particular the acetates.

Examples of inert solvents which can be used are organic solvents or else water. It is also possible to use mixtures of such solvents.

Examples of suitable organic solvents are especially ethanol, butanol, acetic acid, dioxane, formamide, dimethylformamide, dimethylacetamide, ethyl cellosolve, ethylene glycol monomethyl ether, nitrobenzene, N-methylpyrrolidone, dimethyl sulfoxide and acetonitrile.

The reaction temperatures are advantageously between 50° C. and the boiling point of the solvent or solvent mixture used.

The metal complex obtained is isolated in conventional manner, e.g. by filtration. The material on the suction filter is washed thoroughly with solvent. It is generally obtained in good yield and purity and can be used in finely divided form, without further purification, for colouring high-molecular weight organic material.

The metal complexes prepared in the manner described often contain water or small amounts of organic solvent in a bound form, which cannot be removed by drying at temperatures up to 100° C.

If their purity and/or particle shape and size are not yet adequate or optimum, the metal complexes of the present patent application can be conditioned further. Conditioning is understood as meaning the production of a fine particle shape and size optimum for the application, for example by dry grinding with or without salt, by grinding with solvent or water, by kneading with salt or by means of a subsequent heat treatment with solvent.

Heat treatments with solvent can be carried out e.g. in organic solvents, preferably those with a boiling point above 100° C.

Solvents which prove particularly suitable for this purpose are benzenes substituted by halogen atoms or alkyl or nitro groups, such as xylenes, chlorobenzene, o-dichlorobenzene or nitrobenzene, alcohols such as isopropanol or isobutanol, ketones such as cyclohexanone, ethers such as ethylene glycol monomethyl or monoethyl ether, amides such as dimethylformamide or N-methylpyrrolidone, and dimethyl sulfoxide, sulfolan or water by itself, if necessary under pressure. The aftertreatment can also be carried out in water in the presence of organic solvents and/or with the addition of surface-active substances or aliphatic amines, or in liquid ammonia. Depending on the conditioning process and/or intended application, it may be advantageous to add certain amounts of texture-improving agents to the metal complex of the present patent application, before or after the conditioning process. Possible texture-improving agents are, in particular, fatty acids having at least 18 C atoms, for example stearic or behenic acid, or amides or metal salts thereof, especially Mg salts, and plasticizers, waxes, resin acids such as abietic acid, rosin soap, alkylphenols or aliphatic alcohols such as stearyl alcohol, or vicinal diols such as dodecane-1,2-diol, as well as modified rosin/maleate resins or fumaric acid/rosin resins. The texture-improving agents are preferably added in amounts of 0.1–30% by weight, especially 2–15% by weight, based on the end product.

High-molecular weight organic material can be of natural or synthetic origin. It can be e.g. natural resins or siccative oils, rubber or casein, or modified natural substances such as chlorinated rubber, oil-modified alkyd resins, viscose or cellulose ethers or esters such as cellulose acetate, cellulose propionate, cellulose acetobutyrate or nitrocellulose, but in particular fully synthetic organic polymers (duroplasts and thermoplasts) as obtained by polymerization, polycondensation or polyaddition. Particular members of the class of polymerization resins are: polyolefins such as polyethylene, polypropylene or polyisobutylene, and substituted polyolefins such as polymers of vinyl chloride, vinyl acetate, styrene, acrylonitrile, acrylic and/or methacrylic acid esters or butadiene, as well as copolymers of the said monomers, especially ABS or EVA.

Members of the class of polyaddition resins and polycondensation resins are the condensation products of formaldehyde with phenols, i.e. phenoplasts, and the condensation products of formaldehyde with urea, thiourea and melamine, i.e. aminoplasts, the polyesters used as enamel resins, including both saturated resins, e.g. alkyd resins, and unsaturated resins, for example maleate resins, as well as linear polyesters and polyamides or silicones.

The said high-molecular weight compounds can be used individually or in mixtures as plastic materials or melts, which can be spun into fibers if desired.

They can also be used in the polymerized state, in dissolved form, as film-forming agents or binders for lacquers or printing inks, examples being boiled linseed oil, nitrocellulose, alkyd resins, melamine resins and urea/formaldehyde resins or acrylic resins.

The pigmentation of the high-molecular weight organic substances with the metal complexes as defined is carried out for example by mixing such a metal complex pigment, if desired in the form of masterbatches, with these substrates using rolling mills, mixers or grinders. The pigmented material is then converted to the desired final form by processes known per se, such as calendering, compression moulding, extrusion, coating, spinning, casting or injection moulding. It is often desirable to incorporate so-called plasticizers into the high-molecular weight compounds prior to deformation, in order to produce non-rigid moulded articles or to reduce their brittleness. Examples of plasticizers which can be used are esters of phosphoric acid, phthalic acid or sebacic acid. The plasticizers can be incorporated into the polymers before or after the incorporation of the pigment. As a further possibility, aimed at producing different shades, fillers or other colouring constituents, such as white, coloured or black pigments, are also added to the high-molecular weight organic substances in any desired amounts, as well as the metal complex pigments.

For pigmenting lacquers and printing inks, the high-molecular weight organic materials and metal complex pigments, if necessary together with additives such as fillers, other pigments, siccatives or plasticizers, are finely dispersed or dissolved in a common organic solvent or solvent mixture. This can be done by dispersing or dissolving the individual components separately, or else several together, and only then bringing all the components together.

When the metal complex pigments of the present patent application are incorporated into plastics or fibers, they stabilize the latter against the effects of light and weather. Articles manufactured from the coloured substrates are distinguished by a longer service life. When the metal complexes of the present patent application are incorporated into light-stabilized high-molecular organic material, its light stability is not impaired as a rule. In some cases, it may even be possible to observe a synergistic improvement in the light stability.

The colourings obtained preferably contain 0.01–20% by weight of a metal complex pigment as defined, for example in plastics, fibres, lacquers and prints, and are distinguished by good general pigment properties such as good resistance to overcoating, migration, heat, light and weather, and by a good colour strength and a good gloss, but in particular by a very good dispersibility.

When the metal complexes as defined, especially those containing alkoxy or alkyl ester groups with long-chain radicals, are present in very finely divided form in the polymers used, e.g. in polyolefins, especially in polypropylene, they are also distinguished by a clear shade, good colour strength and good light and textile fastness properties such as fastness to rubbing, solvent, shampoo and washing.

In the following Examples, parts and percentages are by weight unless indicated otherwise.

EXAMPLE 1

A mixture of 15.0 g of 2-hydroxypropiophenone and 13.7 g of nicotinic acid hydrazide is stirred in 100 ml of ethyl cellosolve, initially for 18 hours at 120° C. (with distillation of a small amount of solvent) and then for a further 5 hours at room temperature. The light yellow precipitate produced is isolated by suction filtration and washed with ethanol and then with water. 18.5 g of 2-hydroxypropiophenone nicotinoylhydrazone are obtained after the product has been dried at 40°–50° C. under vacuum. 2.7 g of this product are suspended in 30 ml of dimethylformamide and treated with a solution of 2.8 g of nickel(II) acetate•$4H_2O$ in 35 ml of dimethylformamide. The resulting mixture is stirred at 120° C. for 4 hours and the product is then isolated by filtration and subsequently washed with isopropanol and then with water. After the product has been dried under vacuum at 60°–70° C., 2.8 g of a yellow powder of the following formula (or a tautomeric form thereof):

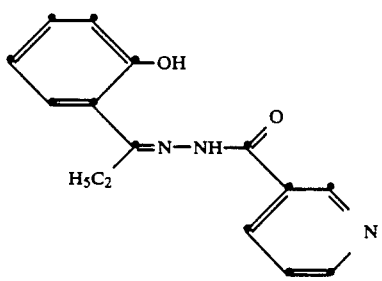

as the 1:1 nickel complex are obtained which gives the following microanalysis:

|  | Ni (in %) |
|---|---|
| Calculated (for $C_{15}H_{13}N_3O_2Ni$): | 17.95 |
| Found: | 18.10 |

EXAMPLE 2

21.5 g of 2-hydroxypropiophenone and 20.7 g of isonicotinic acid hydrazide are stirred in 200 ml of isopropanol for 18 hours at 80° C. The reaction product is isolated by filtration at 40° C., washed with isopropanol and dried at 50° C. under vacuum. Yield: 19.4 g of 2-hydroxypropiophenone isonicotinoylhydrazone with the following microanalysis:

|  | (in %) | | | |
|---|---|---|---|---|
|  | C | H | N | O |
| Calculated (for $C_{15}H_{15}N_3O_2$): | 66.9 | 5.6 | 15.6 | 11.9 |
| Found: | 66.5 | 5.6 | 16.1 | 12.0 | and with the following melting point: 225–231° C.

7.5 g of the dispersant ®Marlon A 375 (from HUELS, Marl FRG) and 111 ml of 30% NaOH are added to a stirred suspension of 296 g of the above 2-hydroxypropiophenone isonicotinoylhydrazone in 5.5 liters of water. The resulting light yellow solution is treated with 110 g of phosphoric acid in 950 ml of water. The yellow suspension produced is stirred for 1 hour at room temperature and 263 g of nickel chloride•6$H_2O$ in 1.6 liters of water are added dropwise over 0.5 hour, the pH of the suspension being kept at 8–8.5 with 15% NaOH. The orange precipitate is stirred for 5 hours at 95° C. The pH of the suspension is then adjusted to 5 with glacial acetic acid and the product is isolated by filtration, washed with water and dried at 80° C. under vacuum. Yield: 330 g of a yellow powder of the following formula:

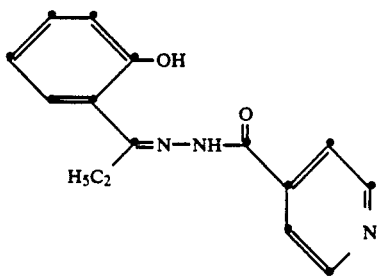

as the 1:1 nickel complex and with the following microanalysis:

|  | (in %) | | | |
|---|---|---|---|---|
|  | C | H | N | Ni |
| Calculated (for $C_{15}H_{13}N_3O_2Ni$): | 55.3 | 4.0 | 12.9 | 17.95 |
| Found: | 55.3 | 4.2 | 12.5 | 17.6 |

EXAMPLE 3

5.7 g of 2-hydroxypropiophenone and 5.5 g of isonicotinic acid hydrazide are stirred in 300 ml of N-methylpyrrolidone for 4 hours at 120°–130° C. The light yellow solution is then treated with 10.2 g of nickel acetate•4$H_2O$ and the resulting mixture is stirred for a further 18 hours at the same temperature. The reddish yellow metal complex is isolated by filtration at 100° C. and washed thoroughly with ethanol and then with water. After the product has been dried under vacuum at 70°–80° C., 9.5 g of a yellow powder of the formula according to Example 2 above are obtained which gives the following microanalysis:

|  | Ni (in %) |
|---|---|
| Calculated (for $C_{15}H_{13}N_3O_2Ni$): | 18.0 |
| Found: | 18.3 |

EXAMPLE 4

21.5 g of 2-hydroxypropiophenone and 20.6 g of picolinic acid hydrazide are stirred in 250 ml of ethyl cellosolve for 18 hours at 110° C. and then for 2 hours at room temperature. The light yellow solution is concentrated on a rotary evaporator to approx. 50% of its volume. The yellow crystals which have precipitated are isolated by filtration and washed with isopropanol and then with water. After the crystals have been dried under vacuum at 50° C., 18 g of 2-hydroxypropiophenone picolinoylhydrazone are obtained which gives the following microanalysis:

|  | (in %) | | | |
|---|---|---|---|---|
|  | C | H | N | O |
| Calculated (for $C_{15}H_{15}N_3O_2$): | 66.9 | 5.6 | 15.6 | 11.8 |
| Found: | 66.8 | 5.5 | 15.8 | 11.9 | and has a melting point of 136–139° C.

2.7 g of 2-hydroxypropiophenone picolinoylhydrazone are reacted with 2.2 g of copper(II) acetate•$H_2O$ in 40 ml of dimethylformamide for 4 hours at 120° C. The resulting greenish yellow metal complex is isolated by filtration at room temperature, washed with isopropanol and then with water and dried at 80° C. under vacuum. Yield: 2.8 g of a compound of the composition $C_{15}H_{13}N_3O_2Cu$, which corresponds to a 1:1 $Cu^{2+}$ complex of the following formula:

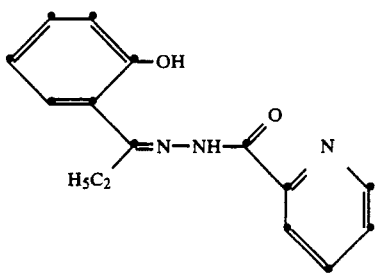

as the 1:1 Cu complex.

EXAMPLE 5

A mixture of 35.2 g of 2-hydroxy-4-methoxybenzophenone and 20.8 g of isonicotinic acid hydrazide is stirred in 150 ml of ethyl cellosolve for 18 hours at 120° C. and the resulting mixture is then cooled to room temperature and filtered. The material on the suction filter is washed with isopropanol and then with water and subsequently dried under vacuum at 50°-60° C. Yield: 11.5 g of 2-hydroxy-4-methoxybenzophenone isonicotinoylhydrazone. 3.5 g of this product are dissolved in 45 ml of dimethylformamide and treated with 2.7 g of nickel(II) acetate•4H$_2$O in 30 ml of water. The reaction mixture is stirred for 5 hours at 95° C. The red crystals which have precipitated are isolated by filtration and washed with isopropanol and then with water. After the product has been dried under vacuum at 80°-90° C., 3.3 g of a reddish yellow powder of the formula

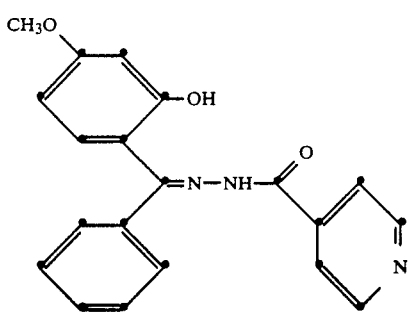

as the 1:1 nickel complex are obtained.

EXAMPLE 6

47.0 g of 2-hydroxy-4-methoxybenzophenone and 27.7 g of picolinic acid hydrazide are stirred in 150 ml of N-methylpyrrolidone for 18 hours at 140° C. After the reaction mixture has cooled to room temperature, the brownish yellow solution is treated with 200 ml of water. The precipitate produced is isolated by filtration and washed with isopropanol and then with water. After the product has been dried under vacuum at 50°-60° C., 57.4 g of 2-hydroxy-4-methoxybenzophenone picolinoylhydrazone are obtained.

3.5 g of this product are suspended in 45 ml of dimethylformamide and treated with a solution of 2.7 g of cobalt(II) acetate•4H$_2$O in 30 ml of water. The resulting mixture is stirred at 95° C. for 5 hours under nitrogen and the product is then isolated by filtration and subsequently washed with isopropanol and then with water. After the product has been dried under vacuum at 70°-80° C., 3.0 g of a yellow powder of the formula

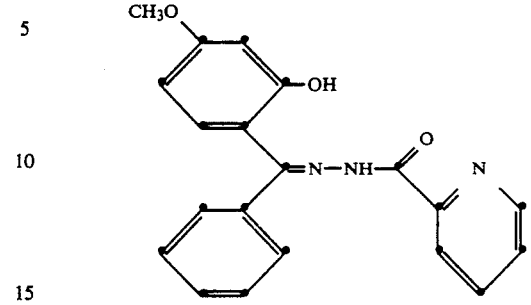

as the 1:1 cobalt complex are obtained which gives the following microanalysis:

|  | (in %) | | | |
| --- | --- | --- | --- | --- |
|  | C | H | N | Co |
| Calculated (for C$_{20}$H$_{15}$N$_3$O$_3$Co): | 59.4 | 3.7 | 10.4 | 14.6 |
| Found: | 59.2 | 3.7 | 10.3 | 13.9 |

EXAMPLE 7

32.6 g of 4-octyloxy-2-hydroxybenzophenone and 13.8 g of isonicotinic acid hydrazide are condensed analogously to Example 6. Yield: 36 g of 4-octyloxy-2-hydroxybenzophenone isonicotinoylhydrazone with the following microanalysis:

|  | (in %) | | | |
| --- | --- | --- | --- | --- |
|  | C | H | N | O |
| Calculated (for C$_{27}$H$_{31}$N$_3$O$_3$): | 72.8 | 7.0 | 9.4 | 10.8 |
| Found: | 72.6 | 7.0 | 9.2 | 10.6 |
| Melting point: 146–148° C. | | | | |

A solution of 4.5 g of 4-octyloxy-2-hydroxybenzophenone isonicotinoylhydrazone in 30 ml of dimethylformamide is treated at 80° C. with a solution of 2.7 g of nickel(II) acetate•4H$_2$O in 30 ml of dimethylformamide. The reaction mixture is stirred for 5 hours at 100° C. and then cooled to room temperature. The resulting yellow metal complex is isolated by filtration, washed with isopropanol and then with water and dried at 80° C. under vacuum. Yield: 4.6 g of a compound of the composition C$_{27}$H$_{29}$N$_3$O$_3$Ni, which corresponds to a 1:1 Ni$^{2+}$ complex of the following formula:

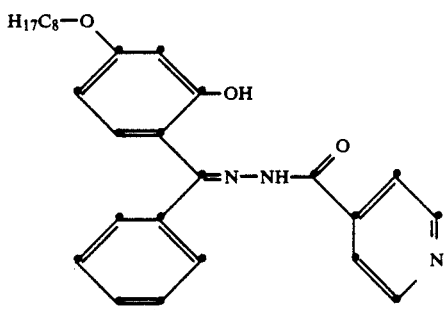

as the 1:1 nickel complex and gives the following microanalysis:

|  | (in %) | | | |
|---|---|---|---|---|
|  | C | H | N | Ni |
| Calculated: | 64.6 | 5.8 | 8.4 | 11.7 |
| Found: | 64.6 | 5.7 | 8.4 | 11.7 |

EXAMPLE 8

20.3 g of 3-acetyl-2,4-dihydroxyquinoline and 13.8 g of isonicotinic acid hydrazide are condensed in 180 ml of ethyl cellosolve analogously to Example 1, yielding 27.2 g of 3-acetyl-2,4-dihydroxyquinoline isonicotinoylhydrazone. 3.2 g of this product are suspended in 25 ml of dimethylformamide and treated with a solution of 2.7 g of nickel(II) acetate•4H$_2$O in dimethylformamide. The resulting mixture is stirred for 2 hours at 80°–90° C. and the product is then isolated by filtration and subsequently washed with isopropanol and then with water. After the product has been dried under vacuum at 70°–80° C., 3.5 g of a yellow powder of the following formula:

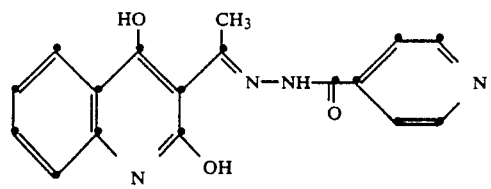

as the 1:1 nickel complex, are obtained which gives the following microanalysis:

|  | (in %) | | | | |
|---|---|---|---|---|---|
|  | C | H | N | Ni | H$_2$O |
| Calculated (for C$_{18}$H$_{13}$N$_4$O$_3$Ni): | 53.7 | 3.4 | 14.7 | 15.5 | — |
| Found: | 52.7 | 3.6 | 14.6 | 14.9 | 1.8 |

EXAMPLE 9

1 g of the pigment prepared according to Example 5, 10 g of titanium dioxide (CL 220 grade from KRONOS, Leverkusen FRG) and 1000 g of HD polyethylene granules (®Vestolen A 6016 from Hüls, FRG) are mixed for 15 min in a 3 l glass flask. The resulting mixture is compression-moulded twice at 200° C. through a small extruder (type 133 from COLLIN, Ebersberg FRG), followed by granulation each time. Using the granules coloured by this process, plates of approx. 3.5×4.5×0.2 cm are injection-moulded at 200° C. in an automatic injection moulding machine (Aarburg 200 D from AARBURG, Lossburg FRG). The melt zone is then heated to 280° C. and further plates of the dimensions indicated above are injection-moulded after a dwell time of 5 minutes. The plates produced both at 200° C. and at 280° C. have a similar intense yellow shade with excellent stability properties.

EXAMPLES 10–19

Likewise, fast yellow to orange metal complexes are obtained by a procedure analogous to Examples 1–8 using in each case one of the carbonyl compounds of the formula R given in Table 1, a hydrazide of the formula H$_2$NNHCOB containing a radical B, and an agent releasing metal cations M, as defined. If these metal complexes are applied in HDPE, as described in Example 9, the shades given in the last column of Table 1 are obtained. The metal complexes have the following formula:

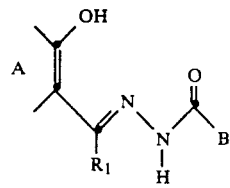

as the 1:1-metal complex, wherein A, R$_1$, B and the metal are as defined in Table 1.

TABLE 1

| Example no. | R | Structure according to above formula | | R$_1$ | M | Shade in HDPE |
|---|---|---|---|---|---|---|
|  |  | B | A |  |  |  |
| 10 | HO-C$_6$H$_4$-CO-C$_2$H$_5$ | pyridyl (N para) | phenyl | —C$_2$H$_5$ | Cu | greenish yellow |
| 11 | HO-C$_6$H$_4$-CO-C$_2$H$_5$ | pyridyl | phenyl | —C$_2$H$_5$ | Cu | greenish yellow |

TABLE 1-continued

| Example no. | R | Structure according to above formula B | A | $R_1$ | M | Shade in HDPE |
|---|---|---|---|---|---|---|
| 12 | 2-hydroxyphenyl C(O)C₂H₅ | pyrazine | phenyl | $-C_2H_5$ | Ni | reddish yellow |
| 13 | 2-hydroxyphenyl C(O)C₄H₉ | pyridine | phenyl | $-C_4H_9$ | Ni | reddish yellow |
| 14 | 2-hydroxy-4-methoxyphenyl C(O)C₆H₅ | pyridine | 2-methoxyphenyl (OCH₃) | $-C_6H_5$ | Cu | yellow |
| 15 | 2-hydroxy-4-methoxyphenyl C(O)C₆H₅ | pyridine | 2-methoxyphenyl (OCH₃) | $-C_6H_5$ | Ni | yellow |
| 16 | 2-hydroxy-4-methoxyphenyl C(O)C₆H₅ | pyridine | 2-methoxyphenyl (OCH₃) | $-C_6H_5$ | Cu | yellow |
| 17 | 2-hydroxy-4-octyloxyphenyl C(O)C₆H₅ | pyridine | 2-octyloxyphenyl (OC₈H₁₇) | $-C_6H_5$ | Cu | greenish yellow |
| 18 | 2-hydroxy-4-dodecyloxyphenyl C(O)C₆H₅ | pyridine | 2-dodecyloxyphenyl (OC₁₂H₂₅) | $-C_6H_5$ | Ni | reddish yellow |
| 19 | quinoline derivative with HO, CH₃, C=O, OH | pyridine | hydroxyquinoline derivative | $-CH_3$ | Ni | reddish yellow |

EXAMPLE 20

1 g of the pigment prepared according to Example 2, 10 g of titanium dioxide (CL 220 grade from KRONOS, Leverkusen FRG) and 1000 g of the plastic ABS (®Terluran 877M from BASF) are mixed for 15 minutes in a 3 l glass flask. The resulting mixture is compression-moulded twice at 190° C. through a small extruder (type 133 from COLLIN, Ebersberg FRG), followed each time by granulation. The material is then dried for 4 hours at 90° C. (TE 25 granule dryer from MAPAG, Bern CH). Using the granules coloured by this process, plates of approx. 3.5×4.5×0.2 cm are injection-moulded at 200° C. in an automatic injection moulding machine (Aarburg 200 D from AARBURG, Lossburg FRG). The melt zone is then heated to 260° C. and further plates of the dimensions indicated above are injection-moulded after a dwell time of 5 minutes. The plates produced both at 200° C. and at 260° C. have a similar reddish yellow shade and are distinguished by good light stability.

EXAMPLE 21

1 g of the pigment prepared according to Example 3, 10 g of titanium dioxide (CL 220 grade from KRONOS, Leverkusen FRG) and 1000 g of a polycarbonate (®Macrolon 2800 from BASF) are mixed for 15 minutes in a 3 l glass flask and predried for 4 hours at 120° C. The resulting mixture is compression-moulded twice at 260° C. through a small extruder (type 133 from COLLIN, Ebersberg FRG), followed each time by granulation. The material is then dried for 4 hours at 120° C. (TE 25 granule dryer from MAPAG, Bern CH).

Using the granules coloured by this process, plates of approx. 3.5×4.5×0.2 cm are injection-moulded at 280° C. in an automatic injection moulding machine (Aarburg 200 D from AARBURG, Lossburg FRG). The melt zone is subsequently heated first to 300° C. and then to 340° C. and further plates of the size indicated above are injection-moulded after a dwell time of 5 minutes at each temperature.

The plates produced at 280° C., 300° C. and 340° C. have a similar reddish yellow shade and are distinguished by good light stability.

EXAMPLE 22

2 g of the pigment prepared according to Example 2, 50 g of titanium dioxide and 1000 g of polyamide 6 (®Ultramid B3K from BASF) are mixed thoroughly and predried for 4 hours at 120° C. The resulting mixture is extruded twice at 220° C. and then granulated and dried again for 4 hours at 120° C. The coloured granules produced by this process are injection-moulded to form plates at 220° C., 260° C. and 280° C. after a dwell time of 5 minutes at each of these temperatures. Intense reddish yellow colourings with very good light stability are obtained.

EXAMPLE 23

1 g of the pigment prepared according to Example 3, 10 g of titanium dioxide and 1000 g of the copolymer ®Xenoy (powder grade from GENERAL ELECTRIC, Bergen NL) are mixed thoroughly. The mixture is extruded twice at 250° C. and then granulated and dried at 120° C. for 4 hours. The coloured granules produced by this process are injection-moulded to form plates at 260° C., 280° C. and 290° C. after a dwell time of 5 minutes at each of these temperatures. Reddish yellow colourings with very good light stability are obtained.

EXAMPLE 24

1 g of the pigment prepared according to Example 2 and 1000 g of the plastic polyethylene terephthalate (PETP, ®Melinor B90 from ICI) are mixed for 15 minutes and predried for 4 hours at 90° C. The mixture is extruded twice at 270° C. and then granulated and dried again at 90° C. for 4 hours. The coloured granules produced by this process are injection-moulded to form plates at 270° C., 280° C., 290° C. and 300° C. after a dwell time of 5 minutes at each of these temperatures. Reddish yellow colourings with very good light stability are obtained.

EXAMPLES 25-34

Likewise, fast yellow to orange colourings in ABS, polycarbonate, polyamide, ®Xenoy and PETP are obtained by a procedure analogous to Examples 20-24 except that a 1:1 metal complex of a ligand listed in Table 2, prepared from a 2-hydroxyketone of the formula R (column 2) and a hydrazide of the formula H₂NNHCOB containing the radical B (column 3), is used in place of the pigment used in the said Examples. The shade of the colouring in ABS is given in column 7.

TABLE 2

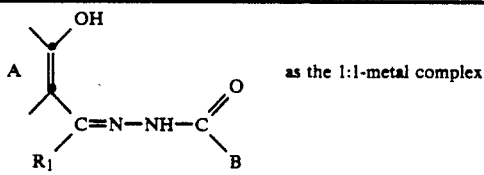

as the 1:1-metal complex

| Example no. | R | Structure according to above formula B | A | R₁ | M | Shade in ABS |
|---|---|---|---|---|---|---|
| 25 | HO O  CH₃ (2-hydroxyacetophenone) | N (pyridyl) | (phenyl) | —CH₃ | Cu | greenish yellow |

TABLE 2-continued structure (shown): A—C(R₁)=N—NH—C(=O)—B, with A bearing C(CH₃)=OH; as the 1:1-metal complex

| Example no. | R | B | A | R₁ | M | Shade in ABS |
|---|---|---|---|---|---|---|
| 26 | 2-hydroxyphenyl-C(=O)CH₃ | pyridyl | phenyl | —CH₃ | Cu | greenish yellow |
| 27 | 2-hydroxyphenyl-C(=O)CH₃ | pyridyl | phenyl | —CH₃ | Ni | reddish yellow |
| 28 | 2-hydroxyphenyl-C(=O)C₂H₅ | pyridyl | phenyl | —C₂H₅ | Cu | greenish yellow |
| 29 | 2-hydroxy-4-methoxybenzoylphenyl | pyridyl | H₃CO-phenyl | —C₆H₅ | Cu | greenish yellow |
| 30 | 2-hydroxy-4-methoxybenzoylphenyl | pyridyl | H₃CO-phenyl | —C₆H₅ | Cu | greenish yellow |
| 31 | 2-hydroxy-4-octyloxybenzoylphenyl (OC₈H₁₇) | pyridyl | H₁₇C₈O-phenyl | —C₆H₅ | Cu | greenish yellow |
| 32 | 2-hydroxy-4-dodecyloxybenzoylphenyl (OC₁₂H₂₅) | pyridyl | H₂₅C₁₂O-phenyl | —C₆H₅ | Ni | yellow |

TABLE 2-continued

Structure: A (with OH group) connected via C(R₁)=N—NH—C(=O)—B, as the 1:1-metal complex

| Example no. | R | B | A | R₁ | M | Shade in ABS |
|---|---|---|---|---|---|---|
| 33 | [2-hydroxy-3-acetyl-methyl-quinoline structure with HO, CH₃, O, N, OH] | [pyridine ring via N] | [hydroxy-naphthyl / N-containing aromatic with OH] | —CH₃ | Ni | yellow |
| 34 | [2-hydroxybenzoyl-methoxyphenyl structure with O, OH, OCH₃] | [pyridine ring via N] | [methoxy-aromatic with H₃CO] | —C₆H₅ | Ni | yellow |

EXAMPLE 35

37.5 g of 2-hydroxypropiophenone are added dropwise over 15 minutes to a solution of 25.1 ml of 30% sodium hydroxide solution in 50 ml of water and then treated with 34.6 g of isonicotinic acid hydrazide. The yellow suspension is stirred for one hour at 80° C. and clarified by filtration at the said temperature. 1000 ml of water are added to the filtrate, followed by 1.87 g of the dispersant ®Marlon A 375 (from Huels, Marl FRG), 55 ml of phosphoric acid (3 molar) and, over approx. 15 minutes, 62.3 g of nickel chloride•6H₂O 200 ml of water, the pH of the suspension being kept at 8–8.5 with 15% NaOH. An orange precipitate is produced. The reaction mixture is stirred for 5 hours at 95° C. The pH of the suspension is then adjusted to 5 with glacial acetic acid and the product is isolated by filtration and washed with water. The moist material on the suction filter is suspended in 2500 ml of water and 14 ml of glacial acetic acid and stirred at 90°–95° C. for 3 hours. The reddish yellow metal complex is isolated by filtration at 80°–90° C. and washed thoroughly with hot water. After the product has been dried under vacuum at 100° C., 73.1 g of a yellow powder of the formula according to Example 2 are obtained.

EXAMPLE 36

5 g of the 1:1 nickel complex obtained according to Example 34 are dispersed for 72 hours in a ball mill with 95 g of an alkydmelamine resin enamel composed of 34.2 g of ®Beckosol 27–320 from Hoechst, FRG, 17.1 g of ®Super Beckamin 13–501 from Reichhold Chemie, Vienna A, 41.8 g of xylene and 1.9 g of methyl glycol.

To produce a full-tone enamel finish, the coloured full-tone enamel is sprayed onto an aluminium sheet, predried for 30 minutes at room temperature and then stoved for 30 minutes at 130° C. The yellow enamel finish produced in this way has a very good resistance to light, weather and overcoating.

To produce a colouring containing white extender pigment, 7 g of the full-tone dispersion are mixed with 33.25 g of white enamel (containing 20% of titanium dioxide RN 59 from KRONOS, Leverkusen FRG), in a reduction ratio of 5 parts of coloured pigment to 95 parts of white pigment, and the mixture is applied under the same conditions as for the fulltone enamel finish. A yellow, intensely coloured enamel finish containing white extender pigment, with a good resistance to light and weather, is obtained.

EXAMPLE 37

Polypropylene granules suitable for fibre production are mixed thoroughly with 1% of the nickel complex according to Example 17. The mixture is spun into filaments on a melt spinning unit at 260°–285° C. and the filaments are then drawn in a ratio of 1:4 on a draw twister and wound onto a spool. An intense yellow colouring distinguished by a good fastness to light, washing, shampoo and solvent (perchloroethylene) is obtained.

EXAMPLE 38

Polypropylene granules suitable for fibre production are mixed thoroughly with 5% of a pigment preparation containing 20% of the nickel complex according to Example 2. The mixture is spun into filaments on a melt spinning unit at 260°–285° C. and the filaments are then drawn in a ratio of 1:4 on a draw twister and wound onto a spool. An intense yellow colouring distinguished by a good fastness to light, washing, dry cleaning, exhaust fumes and peroxide bleach is obtained.

By an otherwise analogous procedure, very fast yellow colourings are likewise obtained when polycaprolactam granules are used in place of polypropylene and the mixture is spun into filaments at 260°–290° C. These colourings are distinguished by good wetfastness properties, especially fastness to washing and shampoo, and good fastness to rubbing and solvent resistance.

The preparation used above is made up as follows:

25 g of the yellow pigment, 37.5 g of polyethylene AC-617 (from ALLIED Chemical USA) and 125 g of sodium chloride are mixed thoroughly in a powder mixer. This mixture is kneaded in a laboratory kneader at 80°-100° C. for 6 hours. 62.5 g of polypropylene powder of the ®Daplen PT 55 type (from CHEMIE Linz) are then added to the kneaded material and the kneader is cooled to 30° C. The resulting preparation is ground with water, isolated by filtration, washed until the washings are free of salt, dried and powdered.

EXAMPLE 39

20.3 g of 3-acetyl-2,4-dihydroxyquinoline and 13.8 g of isonicotinic acid hydrazide are condensed in 180 ml of ethyl cellosolve analogously to Example 1, yielding 27.2 g of 3-acetyl-2,4-dihydroxyquinoline isonicotinoyl-hydrazone. 3.2 g of this product are suspended in 25 ml of dimethylformamide and treated with a solution of 2.4 g of zinc(II) acetate•2H₂O in 35 ml of dimethylformamide. The resulting mixture is stirred for 2 hours at 90°-100° C. and the product is then isolated by filtration and subsequently washed with isopropanol and then with water. After the product has been dried under vacuum at 70°-80° C., 3.2 g of a yellow powder of the following formula:

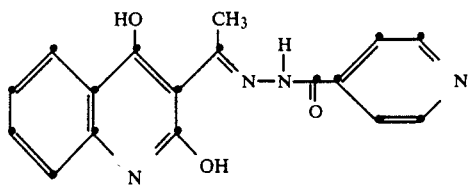

as the 1:1 zinc complex are obtained.

EXAMPLE 40

43.2 g of 4-acetyl-5-hydroxy-3-methyl-1-phenyl-pyrazole are added to 200 ml of ethyl cellosolve and treated with 27.7 g of isonicotinic acid hydrazide. The reaction mixture is stirred for 18 hours at 120° C. (with distillation of a small amount of solvent). The yellow precipitate produced is isolated by suction filtration and washed with ethanol and water. After the product has been dried at 70°-80° C. under vacuum, 47.9 g of reaction product (ligand) are obtained. 6.7 g of this product are suspended in 210 ml of dimethylacetamide and treated with 4.17 g of copper(II) acetate•H₂O. The resulting mixture is stirred at 130° C. for 6 hours under nitrogen and the product is then isolated by filtration and subsequently washed with isopropanol and then with water. After the product has been dried under vacuum at 70°-80° C., 6.9 g of a yellow powder of the formula

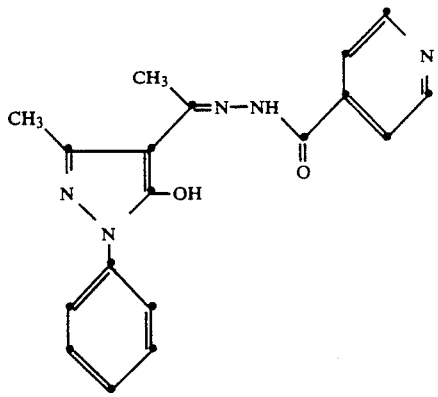

as the 1:1 copper complex are obtained. This copper complex colours PVC with yellow shades.

EXAMPLES 41-50

Likewise, fast yellow colourings in PVC are obtained by a procedure analogous to Example 40 except that a 1:1 metal complex of a ligand of the formula

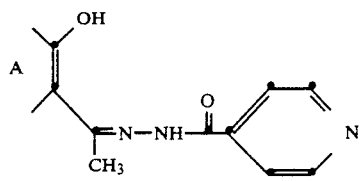

is used in place of the pigment used in the said Example, the ligand being prepared from a 2-hydroxyketone of the formula R (second column of Table 3) and isonicotinic acid hydrazide, and the metal being given in the third column of Table 3. The shade in PVC is given in the fourth column.

TABLE 3

| Example no. | R | M | Shade in PVC |
|---|---|---|---|
| 41 | ![structure] | Ni | yellow |
| 42 | ![structure] | Cu | yellow |
| 43 | | Ni | yellow |
| 44 | | Co | yellow |

TABLE 3-continued

| Example no. | R | M | Shade in PVC |
|---|---|---|---|
| 45 | 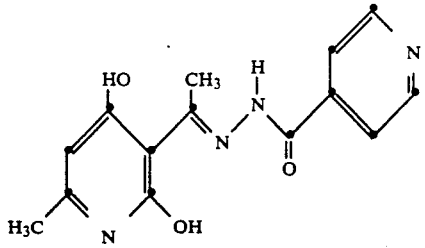 | Cu | greenish yellow |
| 46 | | Ni | yellow |
| 47 | | Cu | greenish yellow |
| 48 | | Ni | yellow |
| 49 | | Cu | greenish yellow |
| 50 | | Ni | yellow |

EXAMPLE 51

33.4 g of 3-acetyl-2,4-dihydroxy-6-methylpyridine are condensed with 2.7 g of isonicotinic acid hydrazide in 450 ml of ethyl cellosolve analogously to Example 1, yielding 51.2 g of the condensation product. 2.9 g of this product are suspended in 50 ml of ethyl cellosolve and treated with 2.8 g of nickel(II) acetate•4H$_2$O. The resulting mixture is stirred for 6 hours at 110°–120° C. and the product is then isolated by filtration and subsequently washed with isopropanol and with water. After the product has been dried under vacuum at 70°–80° C., 3 g of a yellow powder of the following formula:

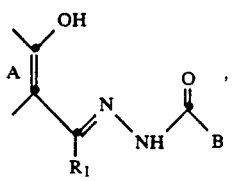

as the 1:1 nickel complex are obtained. Colourings in PVC and lacquers are yellow and fast to migration.

What is claimed is:

1. High-molecular weight organic material containing at least one metal complex of a ligand of formula I:

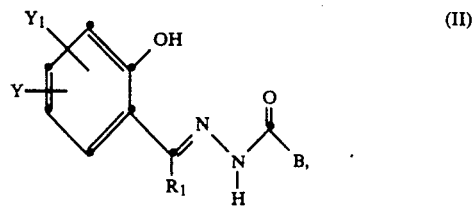

wherein A is a carbocyclic aromatic or heterocyclic aromatic radical, B is a carbocyclic aromatic radical or a heterocyclic aromatic radical containing at least one N atom, it being necessary for at least one of the radicals A and B to be heterocyclic, and R$_1$ is —C$_1$–C$_{18}$-alkyl, a carbocyclic aromatic radical or a heterocyclic aromatic radical containing at least one N atom, and the metal is a transition metal cation carrying a double positive charge selected from Ni$^{2+}$, Cu$^{2+}$, Co$^{2+}$, Zn$^{2+}$, Mn$^{2+}$, Fe$^{2+}$, Cd$^{2+}$ or Pt$^{2+}$ or the radical VO$^{2+}$.

2. High-molecular weight organic material according to claim 1 in which the metal cation is Ni$^{2+}$, Cu$^{2+}$, Co$^{2+}$ or Zn$^{2+}$.

3. High-molecular weight organic material according to claim 1 in which A is a phenylene, phenylphenylene or naphthylene radical, B is a heterocyclic aromatic radical containing an N atom and the metal cation is Ni$^{2+}$, Cu$^{2+}$, Co$^{2+}$ or Zn$^{2+}$.

4. High-molecular weight organic material according to claim 1 in which the ligand has formula II or III:

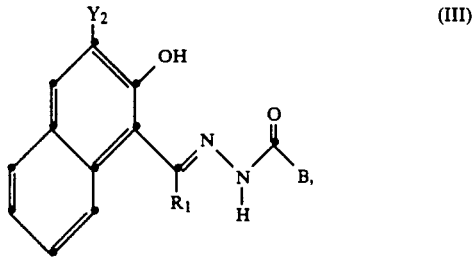

wherein Y is —H or —Cl, Y$_1$ is —H, —Cl, —Br, —CH$_3$ or —OC$_1$–C$_{18}$-alkyl, Y$_2$ is —H, —COOH, —$CONH_2$ or a phenylcarbamoyl group which is unsubstituted or substituted by —Cl and/or —$CH_3$ and/or —$OCH_3$, $R_1$ is —$C_1$-$C_5$-alkyl or a phenyl radical which is unsubstituted or substituted by —Cl, —$CH_3$ or —$OCH_3$, and B is a pyrid-2-, -3- or -4-yl radical, and the metal cation is $Ni^{2+}$, $Cu^{2+}$, $Co^{2+}$ or $Zn^{2+}$.

5. High-molecular weight organic material according to claim 4 in which, in formulae II and III, Y is —H, $Y_1$ is —H, —Cl or —$CH_3$, $Y_2$ is —H, $R_1$ is —$CH_3$, —$C_2H_5$ or —$C_6H_5$ and B is pyrid-2-, -3- or -4-yl, and the metal cation is $Ni^{2+}$, $Cu^{2+}$ or $Co^{2+}$.

6. High-molecular weight organic material according to claim 4, wherein the ligand has formula II in which Y and $Y_1$ are —H, $R_1$ is —$CH_3$, —$C_2H_5$ or —$C_6H_5$ and B is pyrid-2-, -3- or -4-yl, and the metal cation is $Ni^{2+}$ or $Cu^{2+}$.

7. High-molecular weight organic material according to claim 1 in which, in the ligand of formula I, A is a quinoline, isoquinoline, coumarin, pyridine, pyrimidine or pyrazolone radical and B is a heterocyclic aromatic radical containing an N atom, and the metal cation is $Ni^{2+}$, $Cu^{2+}$, $Co^{2+}$ or $Zn^{2+}$.

8. High-molecular weight organic material according to claim 7, wherein the ligand is a quinoline radical of formula IV:

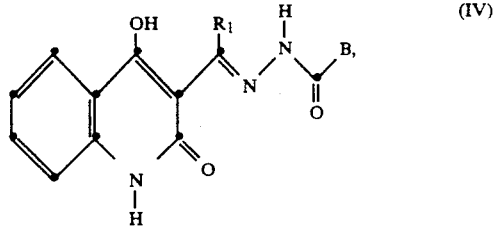

wherein $R_1$ is —$C_1$-$C_5$-alkyl or —$C_6H_5$ and B is pyrid-2-, -3- or -4-yl, and the metal cation is $Ni^{2+}$, $Cu^{2+}$ or $Co^{2+}$.

9. High-molecular weight organic material according to claim 8 in which $R_1$ is —$CH_3$, —$C_2H_5$ or —$C_6H_5$, B is pyrid-2-, -3- or -4-yl and the metal cation is $Ni^{2+}$ or $Cu^{2+}$.

* * * * *